US012593260B2

(12) United States Patent
Wu

(10) Patent No.: US 12,593,260 B2
(45) Date of Patent: Mar. 31, 2026

(54) METHOD AND APPARATUS FOR A MASTER CELL GROUP

(71) Applicant: Lenovo (Beijing) Ltd., Beijing (CN)

(72) Inventor: Lianhai Wu, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 635 days.

(21) Appl. No.: 17/925,847

(22) PCT Filed: May 18, 2020

(86) PCT No.: PCT/CN2020/090893
§ 371 (c)(1),
(2) Date: Nov. 17, 2022

(87) PCT Pub. No.: WO2021/232202
PCT Pub. Date: Nov. 25, 2021

(65) Prior Publication Data
US 2023/0189112 A1     Jun. 15, 2023

(51) Int. Cl.
*H04W 76/38*     (2018.01)
*H04W 36/00*     (2009.01)
(Continued)

(52) U.S. Cl.
CPC ... *H04W 36/305* (2018.08); *H04W 36/00837* (2018.08); *H04W 36/185* (2023.05); *H04W 76/38* (2018.02)

(58) Field of Classification Search
CPC ............. H04W 36/305; H04W 36/185; H04W 36/00837; H04W 76/38
See application file for complete search history.

(56) References Cited

U.S. PATENT DOCUMENTS

2017/0086109 A1* 3/2017 da Silva ................ H04W 76/18
2019/0166646 A1   5/2019 Shih et al.
(Continued)

FOREIGN PATENT DOCUMENTS

CN     1784873 A     6/2006
EP     4152886 A1    3/2023
(Continued)

OTHER PUBLICATIONS

Ericsson , "Failure handling interaction (CHO, fast MCG recovery and timer T312)", 3GPP TSG-RAN WG2 #109bis-P, Tdoc R2-2003036, Electronic meeting [retrieved Dec. 15, 2022]. Retrieved from the Internet., Apr. 2020, 7 Pages (Year: 2020).*
(Continued)

*Primary Examiner* — Jinsong Hu
*Assistant Examiner* — Farideh Madani
(74) *Attorney, Agent, or Firm* — FIG. 1 Patents

(57)     ABSTRACT

Embodiments of the present application relate to a method and an apparatus for a master cell group, e.g., a dual active protocol stack (DAPS) handover procedure and a radio link failure (RLF) report mechanism associated with a source link during the DAPS handover procedure under a 3rd Generation Partnership Project (3GPP) 5G New Radio (NR) system or the like. According to an embodiment of the present application, a method can include: receiving configuration information including a timer associated with fast MCG link recovery; receiving a radio resource control (RRC) reconfiguration message including DAPS configuration information; in response to a RLF of a source link for a MCG, initiating a MCG failure information procedure based on the condition that the timer for handover is running or not. In addition, a RLF-report may be reported to a target cell after a UE successfully accesses to the target cell.

20 Claims, 7 Drawing Sheets

(51) Int. Cl.
    *H04W 36/18*        (2009.01)
    *H04W 36/30*        (2009.01)

(56)                References Cited

U.S. PATENT DOCUMENTS

| 2019/0194715 | A1 | 6/2019 | Shin et al. | |
| 2020/0059395 | A1* | 2/2020 | Chen | H04W 28/082 |
| 2020/0088592 | A1 | 3/2020 | Burrow et al. | |
| 2022/0295354 | A1* | 9/2022 | Kim | H04W 76/22 |
| 2023/0022967 | A1* | 1/2023 | Chang | H04W 76/18 |

FOREIGN PATENT DOCUMENTS

| WO | 2020034840 | A1 | 2/2020 |
| WO | 2020088592 | A1 | 5/2020 |

OTHER PUBLICATIONS

Intel Corporation , "DAPS failure handling", 3GPP TSG RAN WG2 Meeting #108 R2-1914840 Retrieved from the Internet on Nov. 8, 2019 URL:https://ftp.3gpp. org/tsg_ranMWG2_RL2/TSGR2_ 108/Docs/ R2-1914840.zip R2-1914840 DAPS HO failure.doc, Oct. 18, 2019, 4 pages (Year: 2019).*

2022570638 , "Foreign Office Action", U.S. Appl. No. 2022570638, Mar. 4, 2024, 6 pages.

20936157.5 , "Communication Pursuant to Rule 164(1) EPC", EP Application No. 20936157.5, Jan. 18, 2024, 19 pages.

China Telecom , "Even further Mobility enhancement in E-UTRAN", 3GPP TSG RAN meeting #87e, RP-200147, Electronic Meeting. Retrieved from the Internet <https://www.3gpp.org/ftp/tsg_ran/TSG_RAN/TSGR_87e/Docs>, Mar. 2020, 14 pages.

Ericsson , "Open issues and corrections for control plane aspects of DAPS HO", 3GPP TSG-RAN WG2 Meeting #109bis-e, Tdoc R2-2002591, Revision of R2-2000129, Elbonia, Apr. 2020, 33 pages.

Ericsson , "Open issues at fallback to source cell at DAPS handover", 3GPP TSG-RAN WG2 #109 electronic, Tdoc R2-2000125, Elbonia, Feb. 2020, 8 pages.

Nokia , et al., "On RLF reporting for CHO and DAPS", 3GPP TSG-RAN WG2 Meeting #108, R2-1915497, Reno, USA [retrieved Aug. 30, 2023]. Retrieved from the Internet <https://www.3gpp.org/ftp/tsg_ran/WG2_RL2/TSGR2_108/Docs>, Nov. 2019, 3 pages.

Qualcomm Incorporated , "Mobility Robustness Enhancements for combined CHO and DAPS HO", 3GPP TSG-RAN WG2 Meeting #108, R2-1914805, Resubmission of R2-1913677, Reno, USA, Nov. 2019, 3 pages.

202080101193.3 , "Foreign Office Action", CN Application No. 202080101193.3, Sep. 12, 2024, 10 pages.

Ericsson , "[108#28][R16 RRC] RRC Merge—38.331 Email discussion report", 3GPP TSG-RAN WG2 #109e, Tdoc R2-2001085, Elbonia, Feb. 2020, 15 pages.

2022570638 , "Decision to Grant a Patent", JP Application No. 2022570638, Jun. 20, 2024, 6 pages.

2022570638 , "Foreign Office Action", U.S. Appl. No. 2022570638, May 31, 2024, 2 pages.

20936157.5 , "European Search Report", Application No. 20936157. 5, Apr. 25, 2024, 40 pages.

Ericsson , "Subsequent RRC procedures after DAPs handover", 3GPP TSG-RAN WG2 Meeting #109bis-e Tdoc R2-2002591 Retrieved from the Internet on Apr. 9, 2020 https://ftp.3gpp.org/tsg_ran/WG2_RL2/TSG R2_ 109bis-e/Docs/ R2-2002591.zip R2-2002591—Subsequent RRC Procedures after DAPShandover.docx, Apr. 20, 2020, 33 pages.

Intel Corporation , "DAPS failure handling", 3GPP TSG RAN WG2 Meeting #108 R2-1914840 Retrieved from the Internet on Nov. 8, 2019 URL:https://ftp.3gpp.org/tsg_ran/WG2_RL2/TSGR2_ 108/Docs/ R2-1914840.zip R2-1914840 DAPS HO failure.doc, Oct. 18, 2019, 4 pages.

ZTE Corporation , "Remaining aspect of control plane handling in DAPS", 3GPP TSG-RAN WG2 Meeting #109 R2-1914818 Retrieved from the Internet on Nov. 8, 2019 URL:https://ftp.3gpp.org/tsg_ran/WG2_RL2/TSGR2_ 108/Docs/R2-1914818.zip R2-1914818 Remaing aspects of control plane handling in DAPS HO.docx, Nov. 18, 2019, 6 pages.

Ericsson , et al., "[108#28][R16 RRC] 38331 Rel-16 CR Merge", 3GPP TSG-RAN WG2 Meeting #109e, R2-2001086, Elbonia [retrieved Dec. 15, 2022]. Retrieved from the Internet <https://www.3gpp.org/ftp/tsg_ran/WG2_RL2/TSGR2_109_e/Docs?sortby-sizerev>., Feb. 2020, 794 Pages.

Ericsson , "[AT109e][065][R16] R16 NR RRC coordination Email discussion report", 3GPP TSG-RAN WG2 #109e, Tdoc R2- 2002290, Elbonia [retrieved Dec. 15, 2022]. Retrieved from the Internet <https://www.3gpp.org/ftp/tsg_ran/WG2_RL2/TSGR2_109_e/Docs>., Feb. 2020, 9 Pages.

Ericsson , "Failure handling interaction (CHO, fast MCG recovery and timer T312)", 3GPP TSG-RAN WG2 #109bis-e, Tdoc R2-2003036, Electronic meeting [retrieved Dec. 15, 2022]. Retrieved from the Internet <https://www.3gpp.org/ftp/TSG_RAN/WG2_RL2/TSGR2_109bis-e/Docs/?sortby=sizerev>., Apr. 2020, 7 Pages.

PCT/CN2020/090893 , "International Preliminary Report on Patentability", PCT Application No. PCT/CN2020/090893, Dec. 1, 2022, 6 pages.

PCT/CN2020/090893 , "International Search Report and Written Opinion", PCT Application No. PCT/CN2020/090893, Feb. 19, 2021, 7 pages.

"Notice of Allowance", Japanese Application No. 2024-089181, Jul. 22, 2025, 7 pages.

* cited by examiner

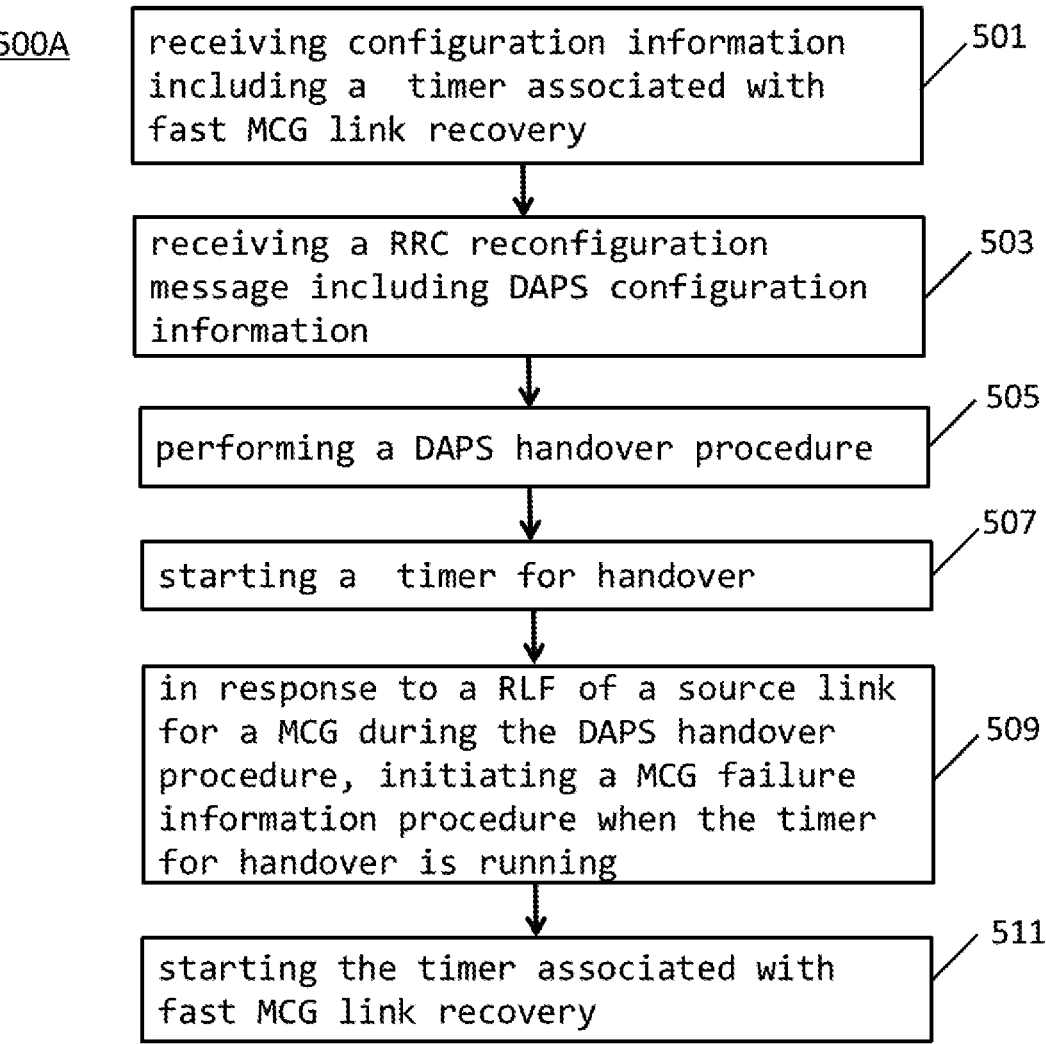

500A receiving configuration information including a timer associated with fast MCG link recovery ⟋501 receiving a RRC reconfiguration message including DAPS configuration information ⟋503 performing a DAPS handover procedure ⟋505 starting a timer for handover ⟋507 in response to a RLF of a source link for a MCG during the DAPS handover procedure, initiating a MCG failure information procedure when the timer for handover is running ⟋509 starting the timer associated with fast MCG link recovery ⟋511

FIG. 5A

500B receiving configuration information including a timer associated with fast MCG link recovery ⟋502 in response to a RLF of a source link for a MCG during a DAPS handover procedure, initiating a MCG failure information procedure when the timer associated with fast MCG link recovery is not running and a timer for handover is not running ⟋504

800

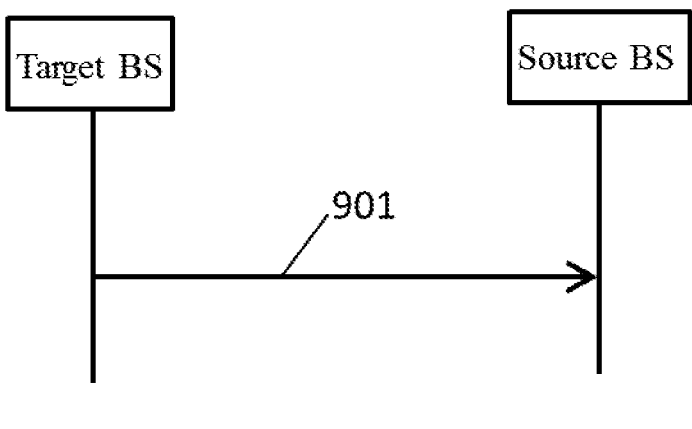

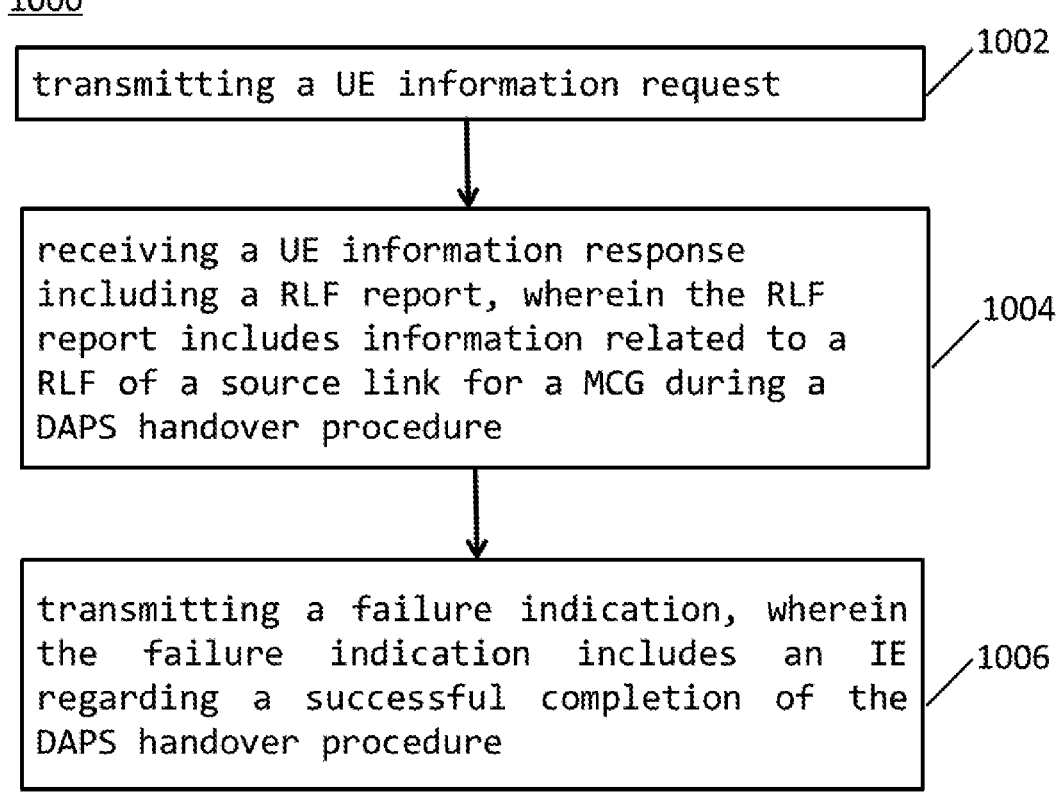

transmitting a UE information request — 1002 receiving a UE information response including a RLF report, wherein the RLF report includes information related to a RLF of a source link for a MCG during a DAPS handover procedure — 1004 transmitting a failure indication, wherein the failure indication includes an IE regarding a successful completion of the DAPS handover procedure — 1006

METHOD AND APPARATUS FOR A MASTER CELL GROUP

TECHNICAL FIELD

Embodiments of the present application generally relate to wireless communication technology, especially to a method and an apparatus for a master cell group (MCG), e.g., for a dual active protocol stack (DAPS) handover procedure and a radio link failure (RLF) report mechanism associated with a source link for MCG during the DAPS handover procedure.

BACKGROUND

When a radio link failure (RLF) or a handover failure (HOF) occurs for a user equipment (UE), the UE may perform a radio resource control (RRC) re-establishment procedure. The UE may access a cell by a successful RRC re-establishment procedure, or access a cell by a connection setup procedure in response to an unsuccessful a RRC re-establishment procedure. The accessed network will request UE information including a RLF report of the UE such that the network can optimize the mobility problem based on the UE information from the UE. Accordingly, the UE will transmit a failure report to the network.

In 3rd Generation Partnership Project (3GPP) standard documents, after a UE receives a handover command associated with a DAPS handover procedure, the connection with a source base station (BS) will still be maintained until the UE releases a source cell of the source BS after successfully completing a random access procedure to a target BS.

Currently, in a 3GPP 5G New Radio (NR) system or the like, details regarding how to solve a coexistence issue of a DAPS handover procedure and a RLF report mechanism for a MCG has not been specifically discussed yet.

SUMMARY

Some embodiments of the present application provide a method for wireless communications. The method may be performed by a UE. The method includes: receiving configuration information including a timer associated with fast master cell group (MCG) link recovery; receiving a radio resource control (RRC) reconfiguration message including dual active protocol stack (DAPS) configuration information; performing a DAPS handover procedure; starting a timer for handover; in response to a radio link failure (RLF) of a source link for a MCG during the DAPS handover procedure, initiating a MCG failure information procedure when the timer for handover is running; and starting the timer associated with fast MCG link recovery.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a further method for wireless communications. The method may be performed by a UE. The method includes: receiving configuration information including a timer associated with fast master cell group (MCG) link recovery; and in response to a radio link failure (RLF) of a source link for a MCG during a dual active protocol stack (DAPS) handover procedure, initiating a MCG failure information procedure when the timer associated with fast MCG link recovery is not running and a timer for handover is not running.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a UE.

Some embodiments of the present application provide a further method for wireless communications. The method may be performed by a UE. The method includes: receiving a radio resource control (RRC) reconfiguration message including a reconfiguration with synchronization information element (IE) and dual active protocol stack (DAPS) configuration information; performing a DAPS handover procedure; and in response to a radio link failure (RLF) of a source link for a master cell group (MCG) during the DAPS handover procedure, transmitting a RLF report related to the RLF after successfully completing the DAPS handover procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a UE.

Some embodiments of the present application provide a further method for wireless communications. The method may be performed by a BS. The method includes: transmitting a user equipment (UE) information request; receiving a UE information response including a radio link failure (RLF) report, wherein the RLF report includes information related to a radio link failure (RLF) of a source link for a master cell group (MCG) during a dual active protocol stack (DAPS) handover procedure; and transmitting a failure indication, wherein the failure indication includes an information element (IE) regarding a successful completion of the DAPS handover procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a BS.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 5A illustrates a flow chart of a method for a DAPS handover procedure in accordance with some embodiments of the present application;

FIG. 9 illustrates a further exemplary signal transmission procedure in accordance with some embodiments of the present application;

FIG. 10 illustrates a further flow chart of a method for a failure indication procedure in accordance with some embodiments of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Next generation radio access network (NG-RAN) supports a multi-radio dual connectivity (MR-DC) operation. In the MR-DC operation, a UE with multiple transceivers may be configured to utilize resources provided by two different nodes connected via non-ideal backhauls. Wherein one node may provide NR access and the other one node may provide either evolved-universal mobile telecommunication system (UMTS) terrestrial radio access (UTRA) (E-UTRA) or NR access. One node may act as a master node (MN) and the other node may act as a secondary node (SN). The MN and SN are connected via a network interface (for example, Xn interface as specified in 3GPP standard documents), and at least the MN is connected to the core network.

Figure 1:
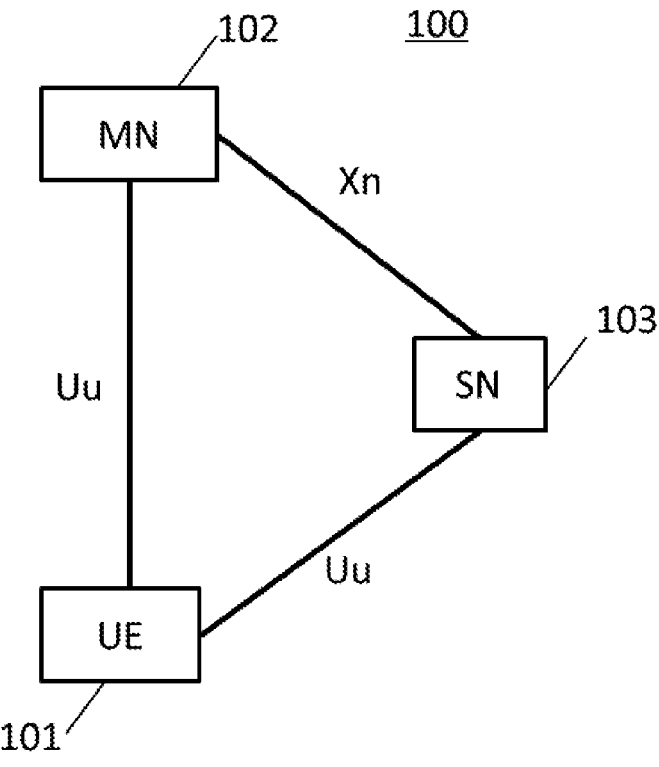
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 may be a dual connectivity system 100, including at least one UE 101, at least one MN 102, and at least one SN 103. In particular, the dual connectivity system 100 in FIG. 1 includes one shown UE 101, one shown MN 102, and one shown SN 103 for illustrative purpose. Although a specific number of UEs 101, MNs 102, and SNs 103 are depicted in FIG. 1, it is contemplated that any number of UEs 101, MNs 102, and SNs 103 may be included in the wireless communication system 100.

Referring to FIG. 1, the UE 101 may be connected to the MN 102 and the SN 103 via a network interface, for example, the Uu interface as specified in 3GPP standard documents. The MN 102 and the SN 103 may be connected with each other via a network interface, for example, the Xn interface as specified in 3GPP standard documents. The MN 102 may be connected to the core network via a network interface (not shown in FIG. 1). The UE 102 may be configured to utilize resources provided by the MN 102 and the SN 103 to perform data transmission.

The MN 102 may refer to a radio access node that provides a control plane connection to the core network. In an embodiment of the present application, in the E-UTRA-NR DC (EN-DC) scenario, the MN may be an eNB. In another embodiment of the present application, in the next generation E-UTRA-NR DC (NGEN-DC) scenario, the MN may be an ng-eNB. In yet another embodiment of the present application, in the NR-DC scenario or the NR-E-UTRA DC (NE-DC) scenario, the MN may be a gNB.

The MN 102 may be associated with a MCG. The MCG may refer to a group of serving cells associated with the MN 102, and may include a primary cell (PCell) and optionally one or more secondary cells (SCells) of the MCG. The PCell may provide a control plane connection to the UE 101.

The SN 103 may refer to a radio access node without a control plane connection to the core network but providing additional resources to the UE 101. In an embodiment of the present application, in the EN-DC scenario, the SN 103 may be an en-gNB. In another embodiment of the present application, in the NE-DC scenario, the SN 103 may be a ng-eNB. In yet another embodiment of the present application, in the NR-DC scenario or the NGEN-DC scenario, the SN 103 may be a gNB.

The SN 103 may be associated with a secondary cell group (SCG). The SCG may refer to a group of serving cells associated with the SN 103, and may include a primary secondary cell (PSCell) and optionally one or more secondary cells (SCells).

The PCell of the MCG and the PSCell of the SCG may also be referred to as a special cell (SpCell).

In some embodiments of the present application, the UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. In some other embodiments of the present application, the UE 101 may include a portable wireless communication device, a smart phone, a cellular telephone, a flip phone, a device having a subscriber identity module, a personal computer, a selective call receiving circuitry, or any other device that is capable of sending and receiving communication signals on a wireless network. In some other embodiments of the present application, the UE 101 may include wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

Figure 2:
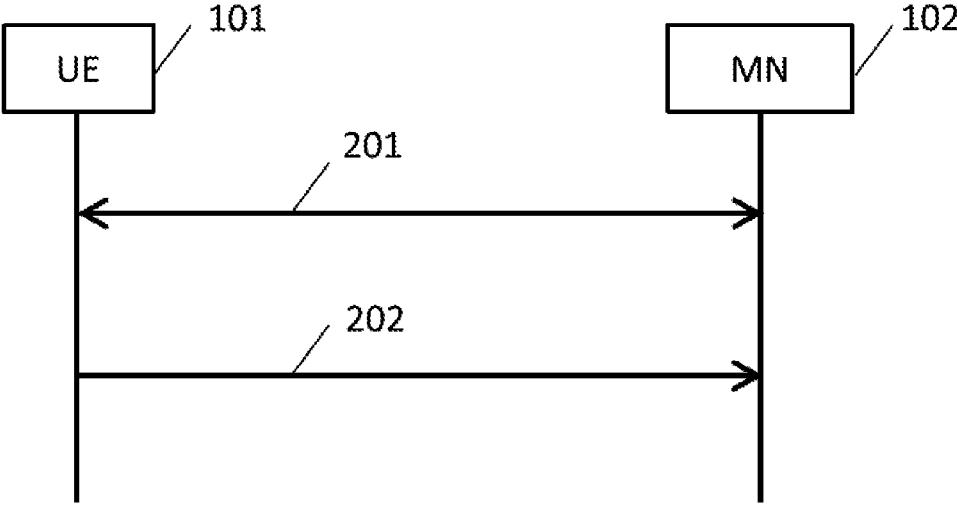
FIG. 2 illustrates an exemplary flowchart of a failure information procedure in accordance with some embodiments of the present application.

FIG. 2 illustrates an exemplary flowchart of a failure information procedure in accordance with some embodiments of the present application. The failure information procedure may be referred to as a failure information report procedure. The embodiments of FIG. 2 include the following embodiments of a SCG failure information procedure or a MCG failure information procedure.

Specifically, in some embodiments of a SCG failure information procedure, in operation 201 as shown in FIG. 2, the UE 101 and MN 102 may communicate RRC reconfiguration information. In operation 202 as shown in FIG. 2, the UE 101 may initiate the SCG failure information procedure and transmit a message associated with a failure for a SCG to the MN 102. The message associated with the failure for the SCG in operation 202 may be a SCGFailureInformation message as specified in 3GPP standard documents. Then, the MN 102 may handle the SCGFailureInformation message and decide whether to keep a SN or a SCG, change the SN or the SCG, or release the SN or the SCG. The SN may be SN 103 as shown and illustrated in FIG. 1.

In the abovementioned embodiments of a SCG failure information procedure, the UE 101 may initiate the SCG failure information procedure to report a failure for the SCG when one of the following conditions is met:

Upon detecting a failure for the SCG. For example, the failure for the SCG may refer to a RLF happening in a PSCell of the SCG.

Upon a reconfiguration with synchronization failure of the SCG.

Upon a SCG configuration failure.

Upon an integrity check failure indication from lower layer(s) of the SCG concerning signaling radio bearer (SRB) 3.

In 3GPP Release 16, a fast MCG link recovery procedure is introduced for a MR-DC scenario. The fast MCG link recovery procedure may be also referred to as a MCG failure information procedure. The purpose of this procedure is to inform a RLF for a MCG to a MN via a SN connected to a UE, such that the UE in RRC_CONNECTED state may initiate the fast MCG link recovery procedure to quickly continue a RRC connection without performing a re-establishment procedure.

In some other embodiments of FIG. 2 of the present application, in the case that a failure for a MCG happens, the UE 101 may initiate (or, trigger) a fast MCG link recovery procedure, i.e., a MCG failure information procedure.

Specifically, in some embodiments of a MCG failure information procedure, as shown in FIG. 2, in operation 201, the UE 101 and the MN 102 may communicate RRC reconfiguration information. In operation 202, the UE 101 may initiate a MCG failure information procedure and transmit a message associated with a failure for a MCG to the MN 102. For example, the failure for the MCG may refer to a RLF happening in a PCell of the MCG. The message associated with the failure for the MCG in operation 202 may be a MCGFailureInformation message as specified in 3GPP standard documents.

In the embodiments of a MCG failure information procedure, the UE 101 may not directly transmit the message associated with the failure for the MCG to the MN 102. Instead, the UE 101 may transmit the message associated with the failure for the MCG to a SN (e.g., SN 103 as shown and illustrated in FIG. 1), and then the SN may transfer the message received from the UE 101 to the MN 102.

For example, the UE 101 may be configured with a split SRB1 or SRB3 to report the MCG failure information when a failure for the MCG happens. In the case that split SRB1 is configured, the UE 101 may submit the MCGFailureInformation message to low layer(s), e.g., for transmission via SRB1. In the case that SRB3 is configured, the UE 101 may submit the MCGFailureInformation message to low layer(s), e.g., for transmission via SRB3. For instance, the MCGFailureInformation message may be embedded in NR RRC message ULInformationTransferMRDC as specified in 3GPP standard documents for transmission via SRB3.

When or after transmitting the message in operation 202, the UE 101 may start a timer associated with a fast MCG link recovery procedure. In an embodiment of the present application, the timer associated with a fast MCG link recovery procedure may be T316 as specified in 3GPP standard documents.

After receiving the message associated with the failure for the MCG, the MN 102 may further transmit a response message to the UE 101. The response message may be a RRC reconfiguration message including a handover (HO) command for a cell. The response message may be a RRC release message. In an embodiment of the present application, the handover command may be a reconfigurationWithSync configuration as specified in 3GPP standard documents. The MN 102 may not directly transmit the response message to the UE 101. Instead, the MN 102 may transmit the response message to a SN (e.g., SN 103 as shown and illustrated in FIG. 1), and then the SN may transfer the response message to the UE 101.

In the case that SRB3 is configured for transmitting the message associated with the failure for the MCG, after receiving the response message from the MN 102, the SN 103 may encapsulate the response message in a DLInformationTransferMRDC message as specified in 3GPP standard documents, and then transmit the DLInformationTransferMRDC message to the UE 101.

In the abovementioned embodiments of a MCG failure information procedure, the UE 101 may set a MCG failure type (referred to as "failureType") as follows:

If the UE 101 initiates a transmission of the MCGFailureInformation message as shown in operation 202, due to the expiry of a timer T310 (which may be referred to as a physical layer problem timer) as specified in 3GPP standard documents, the UE 101 sets the failureType as t310-Expiry as specified in 3GPP standard documents.

If the UE 101 initiates a transmission of the MCGFailureInformation message as shown in operation 202, to provide a random access problem indication from a medium access control (MAC) layer of a MCG, the UE 101 sets the failureType as randomAccessProblem as specified in 3GPP standard documents.

If the UE 101 initiates a transmission of the MCGFailureInformation message as shown in operation 202, to provide indication from MCG radio link control (RLC) that the maximum number of retransmissions has been reached, the UE 101 sets the failureType as rlc-MaxNumRetx as specified in 3GPP standard documents.

In the case of implementing a DAPS handover procedure, a UE continues to receive downlink user data from a source BS until releasing a source cell of the source BS, and the UE continues to transmit uplink user data transmission(s) to the source BS until successfully completing a random access procedure to a target BS. When the DAPS handover procedure fails, the UE may report a DAPS handover (HO) failure via the source BS without triggering a RRC connection re-establishment procedure if the source link has not been released.

In control plane handling in handover associated with a DAPS handover procedure, messages are directly exchanged between the BSs. A specific example is shown in FIG. 3 below.

Figures 3, 4:
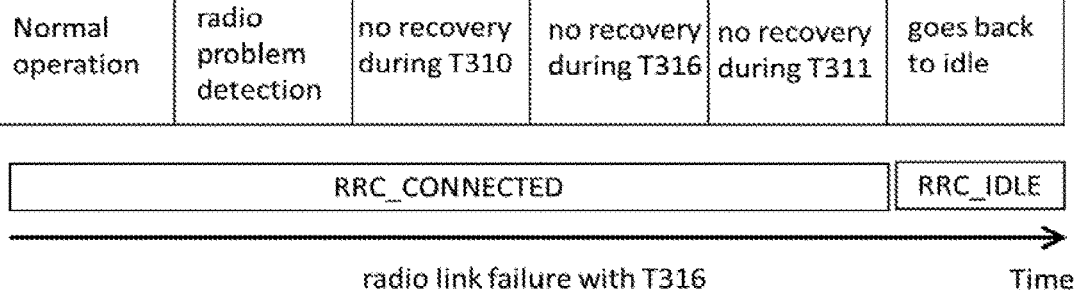
FIG. 3 illustrates an exemplary flowchart of an intra-AMF (access and mobility management function) handover procedure in accordance with some embodiments of the present application.
FIG. 4 illustrates an exemplary timeline of a RLF with a fast MCG link recovery procedure in accordance with some embodiments of the present application.

FIG. 3 illustrates an exemplary flowchart of an intra-AMF handover procedure in accordance with some embodiments of the present application. The embodiments of FIG. 3 depict a basic conditional handover scenario where neither an access and mobility management function (AMF) nor user plane functions (UPFs) changes.

Referring to FIG. 3, in operation 301, a source BS may transmit measurement configuration information to a UE. The UE may report a measurement result to the source BS based on the measurement configuration information. In operation 302, the source BS may decide to handover the UE, which may be based on the measurement result reported by the UE.

In operation 303, the source BS may transmit a HANDOVER REQUEST message to a target BS. For example, the HANDOVER REQUEST message may pass a transparent RRC container with necessary information to prepare a handover procedure at the target BS side.

In operation 304, the target BS may perform admission control based on the load of a target cell of the target BS, to decide whether to allow the handover procedure of the UE after receiving the handover request message from the source BS.

In operation 305, based on an admission control result, the target BS may prepare handover resource(s) for the UE and send HANDOVER REQUEST ACKNOWLEDGE including a RRC reconfiguration message to the source BS.

In operation 306, a RAN handover initiation is performed. The source BS may transmit the RRC reconfiguration message to the UE. The RRC reconfiguration message may include reconfiguration with synchronization information element (IE). The RRC reconfiguration message may contain information required to access the target cell of the target BS.

In operation 307, the source BS may send the SN STATUS TRANSFER message to the target BS.

In operation 308, the UE may access to the target cell and complete the handover procedure by sending RRCReconfigurationComplete message to the target BS. In some embodiments of implementing a DAPS handover procedure, the UE does not detach from the source cell upon receiving the RRCReconfiguration message. For instance, the UE may release source resource(s) upon receiving an explicit release indication from the target BS.

In operation 309, the target BS may send a PATH SWITCH REQUEST message to AMF, to trigger a 5G core (5GC) network to switch a downlink (DL) data path towards the target BS.

In operation 310, the 5GC network may switch the DL data path towards the target BS. UPF(s) may send one or more "end marker" packets on the old (source) data path to the source BS per a packet data unit (PDU) session or a PDU tunnel. Then, the UPF(s) can release any user plane or transport network layer (TNL) resources towards the source BS.

In operation 311, the AMF may confirm the PATH SWITCH REQUEST message with the PATH SWITCH REQUEST ACKNOWLEDGE message.

In operation 312, in response to the reception of the PATH SWITCH REQUEST ACKNOWLEDGE message from the AMF, the target BS may send the UE CONTEXT RELEASE message, to inform the source BS about the success of the handover procedure. The source BS can then release radio and control plane related resource(s) associated with the UE context. Any ongoing data forwarding may continue.

FIG. 4 illustrates an exemplary timeline of a RLF with a fast MCG link recovery procedure in accordance with some embodiments of the present application. The embodiments of FIG. 4 may be performed by a UE (e.g., UE 101 as shown and illustrated in FIG. 1).

As shown in FIG. 4, a UE firstly performs a data transmission at a stage of a normal operation. The UE detects a radio link problem if, for example, a MAC layer of the UE receives the N310 consecutive out-of-sync indication from a physical layer of the UE, which means a radio link problem occurs. The UE then starts a timer, e.g., timer T310 as specified in 3GPP standard documents. During the period of timer T310, if the MAC layer of the UE receives the N311 consecutive in-sync indication from the physical layer, which means that the UE is successfully connected to a network, the UE may stop timer T310.

When timer T310 expires, which means no recovery during timer T310, the UE initiates a fast MCG link recovery procedure. Specifically, the UE transmits MCG failure information to a MN (e.g., MN 102 as shown and illustrated in FIG. 1) via a SN (e.g., SN 103 as shown and illustrated in FIG. 1) and starts timer T316 as specified in 3GPP standard documents, as shown in FIG. 4. If the UE receives RRC reconfiguration from the MN via the SN, the UE stops timer T316, which means that the fast MCG link recovery procedure is terminated. Otherwise, in response to timer T316 expiry, which means no recovery during timer T316, the UE performs a RRC re-establishment procedure and starts timer T311 as specified in 3GPP standard documents for a cell selection.

If timer T311 expires, which means no recovery during timer T311, the UE goes back to an idle state, e.g., a RRC_IDLE state. Before timer T311 expires, the UE is in RRC_CONNECTED state as shown in FIG. 4. After timer T311 expires, the UE enters into in the RRC_IDLE state as shown in FIG. 4.

The above descriptions regarding the embodiments of FIG. 4 do not consider timer T312. Some embodiments assume that timer T312 as specified in 3GPP standard documents is configured. In these embodiments, the UE will start timer T312, if timer T310 is running and a measurement report for a measurement identity for which timer T312 has been configured is triggered. After timer T312 expires, the UE may declare a failure and trigger a failure recovery procedure, e.g., a fast MCG link recovery procedure which has been configured.

Embodiments of the present application provide coexistence scenarios of a DAPS handover procedure and a RLF report mechanism for a MCG. More details on embodiments of the present application will be illustrated in the following text in combination with the appended drawings.

Embodiments of the present application may solve issues on: (1) how to handle a case in which a RLF happens on a source link of a MCG when UE is performing a DAPS handover procedure and if a fast MCG link recovery procedure is configured for the UE; and (2) how to handle a case in which a UE receives a response from a MN via a SN when a timer associated with fast MCG link recovery is running and a DAPS handover procedure is ongoing. Specific examples are described and shown in FIGS. 5A and 5B.

FIG. 5A illustrates a flow chart of a method for a DAPS handover procedure in accordance with some embodiments of the present application.

The method 500A as shown in FIG. 5A may be performed by a UE (e.g., UE 101 as shown and illustrated in FIGS. 1 and 2). For example, the UE may be configured with DC, in which the UE is connected to a MN (e.g., MN 102 as shown and illustrated in FIGS. 1 and 2) and a SN 103 (e.g., SN 103 as shown and illustrated in FIG. 1).

In the embodiments of FIG. 5A, when the UE is performing a DAPS handover procedure, the UE may be allowed to initiate or trigger a fast MCG link recovery procedure (e.g., a MCG failure information procedure).

In one example, if a fast MCG link recovery procedure is triggered (e.g., timer T316 is running) when the UE is performing a DAPS handover procedure, the UE may report MCG failure information to a source MN via a SN. The source MN may transmit a RRC reconfiguration message including a handover command or transmit a release message to the UE. In this case, if the DAPS handover procedure is ongoing, a RRC connection re-establishment procedure should not be triggered by the UE upon the timer associated with fast MCG link recovery (e.g., timer T316) expiry.

In a further example, if a timer for handover is triggered (e.g., timer T304 is running), the UE does not initiate a RRC connection re-establishment procedure after the timer associated with fast MCG link recovery (e.g., timer T316) expires.

In another example, if a timer for handover is not triggered (e.g., timer T304 is not running), the UE may initiate a RRC connection re-establishment procedure after the timer associated with fast MCG link recovery (e.g., timer T316) expires.

Specifically, as shown in FIG. 5A, in operation 501, a UE may receive configuration information including a timer associated with fast MCG link recovery. For example, the timer associated with fast MCG link recovery may be timer T316 as specified in 3GPP standard documents.

In operation 503, the UE may receive a RRC reconfiguration message. The RRC reconfiguration message includes DAPS configuration information. The DAPS configuration information may be a DAPS bearer. In operation 505, the UE may perform a DAPS handover procedure.

In operation 507, the UE may start a timer for handover. A timer value of the timer for handover may be included in a reconfiguration with synchronization IE. In an embodiment of the present application, the timer for handover is timer T304 as specified in 3GPP standard documents.

In operation 509, in response to a RLF of a source link for a MCG during the DAPS handover procedure, initiating a MCG failure information procedure when the timer for handover is running. In operation 511, the UE may start the timer associated with fast MCG link recovery (e.g., timer T316) included in the configuration information received in operation 501.

In an embodiment of the present application, the UE may transmit a MCG failure information message in response to initiating the MCG failure information procedure. When or after transmitting a MCG failure information message, if the timer associated with fast MCG link recovery expires, the UE may not initiate a RRC connection re-establishment procedure when performing the DAPS handover procedure.

When or after transmitting a MCG failure information message, the UE may receive another RRC reconfiguration message. For instance, the UE may receive this RRC reconfiguration message after transmitting the MCG failure information message. The UE may receive this RRC reconfiguration message when the timer associated with fast MCG link recovery is running. For example, this RRC reconfiguration message may include a reconfiguration with synchronization IE. The reconfiguration with synchronization IE may be reconfigurationWithSync IE as specified in 3GPP standard documents.

In one example, after receiving the abovementioned another RRC reconfiguration message, the UE may execute a reconfiguration with synchronization procedure, and the UE may stop performing the ongoing DAPS handover procedure. In another example, after receiving the abovementioned another RRC reconfiguration message, the UE may ignore this RRC reconfiguration message but continue performing the ongoing DAPS handover procedure.

In an embodiment of the present application, the UE may receive a RRC release message. For instance, the UE may receive the RRC release message after transmitting a MCG failure information message. The UE may receive the RRC release message when the timer associated with fast MCG link recovery is running. After receiving the RRC release message, the UE may release resource(s) associated with the source link on which the RLF happens and continue performing the DAPS handover procedure. Alternatively, the UE may ignore the RRC release message and continuing performing the DAPS handover procedure.

The following texts describe a specific Embodiment 1 of the method as shown and illustrated in FIG. 5A for solving the above issues.

According to Embodiment 1, a UE (e.g., UE 101 as shown and illustrated in FIGS. 1 and 2) performs the following operations:

(1) A UE accesses to a network via a DC operation.
   The configuration for a MCG and a SCG may be configured to the UE.
   A fast MCG link recovery procedure, e.g., the value of timer T316 may be configured to the UE.

(2) The UE reports measurement results to the network (e.g., a PCell or a PSCell).

(3) A source BS transmits a Handover Request message to the target BS.

(4) The target BS prepares handover resource(s) for the UE and sends the HANDOVER REQUEST ACKNOWLEDGE including a RRC reconfiguration message to the source BS.

(5) The source BS sends a RRC reconfiguration message including ReconfigurationWithSync IE to the UE, which contains information required to access a target cell of the target BS.

This operation of the BS is associated with contents related to operation 306 in FIG. 3. The RRC reconfiguration message including reconfigurationWithSync IE can be used for a mobility purpose. For example, the RRC reconfiguration message including reconfigurationWithSync IE can be used for a normal handover procedure, a conditional handover procedure, a DAPS handover procedure, and/or a PScell change procedure.

The configuration information of a DAPS handover procedure (e.g., dapsConfig as specified in 3GPP standard documents) may be configured for a data radio bearer (DRB).

(6) The UE accesses to the target cell.

In a case of a DAPS handover procedure, the UE does not detach from the source cell upon receiving the RRC reconfiguration message. The UE continues to monitor the source cell.

(7) The UE detects a RLF in source Pcell when the UE performs the DAPS handover procedure.

(8) The UE transmits a MCG failure information message to a MN via a SN and starts timer T316.

(9) The UE adopts different actions under different scenarios:

(a) If the UE receives a response from the MN via the SN before timer T316 expires:

If the UE receives the RRC reconfiguration message including reconfigurationWithSync IE:

Option A-1: the UE may execute a reconfiguration with sync procedure and stop the ongoing DAPS handover procedure.

Option A-2: the UE ignores the received RRC reconfiguration message and continues the ongoing DAPS handover procedure.

If the UE receives a RRC release message:

Option B-1: the UE may release source connection and continue the ongoing DAPS handover procedure.

Option B-2: the UE may ignore the received RRC reconfiguration message and continue the ongoing DAPS handover procedure.

(b) If the UE does not receive a response from the MN via the SN before timer T316 expires. Namely, if timer T316 expires:

Option (1): Re-establishment procedure should not be triggered in response to that timer T316 expires if timer T304 is running.

Option (2): the UE may initiate a re-establishment procedure in response to that timer T316 expiries only if timer T304 is not running.

(10) The UE continues the DAPS handover procedure and accesses to the target cell.

Figure 5B:
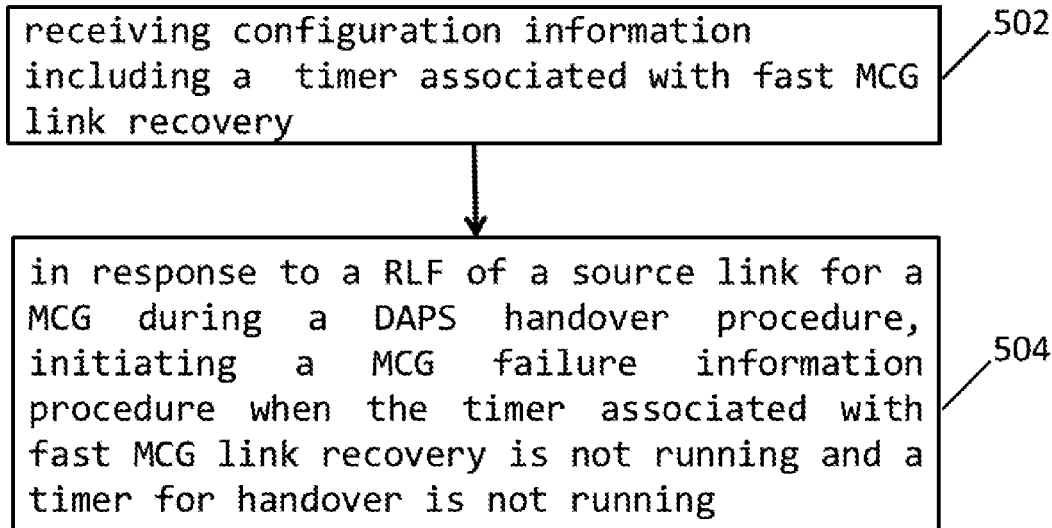
FIG. 5B illustrates a flow chart of a method for a MCG failure information procedure in accordance with some embodiments of the present application.

FIG. 5B illustrates a flow chart of a method for a MCG failure information procedure in accordance with some embodiments of the present application. The method 500B as shown in FIG. 5B may be performed by a UE (e.g., UE 101 as shown and illustrated in FIGS. 1 and 2). The UE may be configured with DC, in which the UE is connected to a MN (e.g., MN 102 as shown and illustrated in FIGS. 1 and 2) and a SN 103 (e.g., SN 103 as shown and illustrated in FIG. 1).

In the embodiments of FIG. 5B, when the UE is performing a DAPS handover procedure, the UE may be not allowed to initiate or trigger a fast MCG link recovery procedure (e.g., a MCG failure information procedure). Under certain condition(s), the UE may initiate or trigger a fast MCG link recovery procedure (e.g., a MCG failure information procedure).

As shown in FIG. 5B, in operation 502, a UE may receive configuration information including a timer associated with fast MCG link recovery, for example, timer T316 as specified in 3GPP standard documents. In operation 504, if a RLF happens on a source link for a MCG during a DAPS handover procedure, when the timer associated with fast MCG link recovery (e.g., timer T316) is not running and a timer for handover is not running, the UE may initiate a MCG failure information procedure.

In an embodiment of the present application, the timer for handover is timer T304 as specified in 3GPP standard documents. In this embodiment, if a RLF happens on a source link of the MCG, if timer T316 is not running, and if timer T304 is not running, the UE may initiate the MCG failure information procedure.

In another embodiment of the present application, the timer for handover is associated with DAPS configuration information. For instance, the DAPS configuration information is included in a RRC reconfiguration message received by the UE. In this embodiment, if a RLF happens on a source link of the MCG, if timer T316 is not running, and if DAPS configuration is not configured for any DRB, the UE may initiate the MCG failure information procedure.

The following texts describe a specific Embodiment 2 of the method as shown and illustrated in FIG. 5B for solving the above issues.

According to Embodiment 2, a UE (e.g., UE 101 as shown and illustrated in FIGS. 1 and 2) and a MN (e.g., MN 102 as shown and illustrated in FIGS. 1 and 2) perform the following operations:

(1) A UE accesses to a network via a DC operation.

The configuration for a MCG and a SCG may be configured to the UE.

A fast MCG link recovery procedure, e.g., the value of timer T316 may be configured to the UE.

(2) The UE detects a RLF in a source link for a MCG (e.g., a Pcell).

(3) The UE adopts different actions under different scenarios:

Upon detecting RLF of the MCG, if timer T316 is not running and timer T304 is not running, the UE may initiate a MCG failure information procedure.

Upon detecting RLF of the MCG, if timer T316 is not running and DAPS configuration is not configured for any DRB, the UE may initiate the MCG failure information procedure.

After initiating the MCG failure information procedure, the UE may suspend a SCG transmission for all signaling radio bearers (SRBs) and DRBs except signaling radio bearer (SRB) 0.

(4) The UE transmits a MCG failure information message to a MN via a SN and starts timer T316. A failure type and available measurement results will be included in the MCG failure information message.

(5) After receiving the MCG failure information message via a SN, the MN may transmit a response (e.g., a RRC reconfiguration with reconfigurationWithSync IE) to UE.

(6) The UE receives the response (e.g., RRC reconfiguration with reconfigurationWithSync IE) from the MN via the SN. Then, the UE may perform a handover procedure and a synchronization procedure to the target cell.

Details described in all other embodiments of the present application (for example, details of how to solve a coexistence issue of a DAPS handover procedure and a RLF report mechanism for a MCG) are applicable for the embodiments of FIGS. 5A and 5B. Moreover, details described in the embodiments of FIGS. 5A and 5B are applicable for all the embodiments of FIGS. 1-4 and 6-11.

Figure 6:
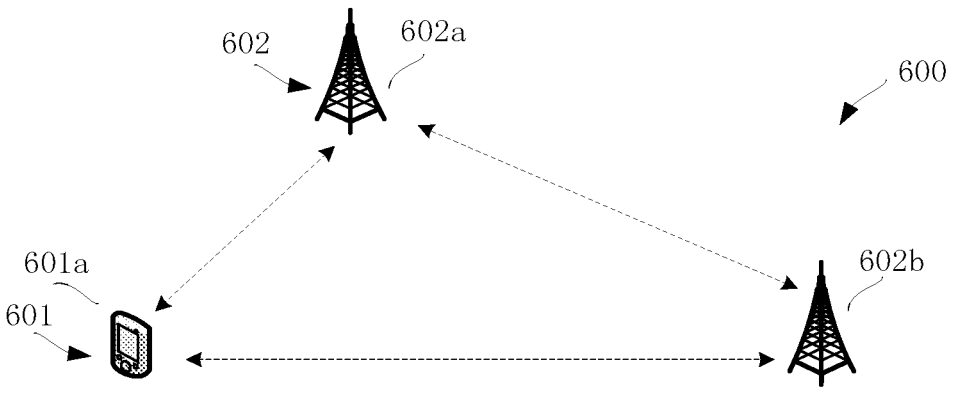
FIG. 6 illustrates a schematic diagram of a wireless communication system in accordance with some embodiments of the present application.

FIG. 6 illustrates a schematic diagram of a wireless communication system in accordance with some embodiments of the present application.

As illustrated and shown in FIG. 6, a wireless communication system 600 includes at least one user equipment (UE) 601 and at least one base station (BS) 602. In particular, the wireless communication system 600 includes one UE 601 (e.g., UE 601*a*) and two BSs 602 (e.g., BS 602*a* and BS 602*b*) for illustrative purpose. Although a specific number of UEs 601 and BSs 602 are depicted in FIG. 6, it is contemplated that any number of UEs 601 and BSs 602 may be included in the wireless communication system 600.

The UE 601 as shown and illustrated in FIG. 6 has similar functions and characteristics as those of UE 101 as shown and illustrated in FIG. 1. Details refer to the above descriptions for the embodiments of FIG. 1.

The BS(s) 602 may be distributed over a geographic region. In certain embodiments of the present application, each of the BS(s) 602 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 602 is generally a part of a radio access network that may include one or more controllers communicably coupled to one or more corresponding BS(s) 602. BS(s) 602 may communicate directly with each other. For example, BS(s) 602 may communicate directly with each other via Xn interface or X2 interface.

The wireless communication system 600 may be compatible with any type of network that is capable of sending and receiving wireless communication signals. For example, the wireless communication system 600 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 600 is compatible with the 5G NR of the 3GPP protocol, wherein BS(s) 602 transmit data using an OFDM modulation scheme on the DL and the UE(s) 601 transmit data on the UL using a single-carrier frequency division multiple access (SC-FDMA) or OFDM scheme. More generally, however, the wireless communication system 600 may implement some other open or proprietary communication protocols, for example, WiMAX, among other protocols.

In some embodiments of the present application, the BS(s) 602 may communicate using other communication protocols, such as the IEEE 802.11 family of wireless communication protocols. Further, in some embodiments of the present application, the BS(s) 602 may communicate over licensed spectrums, whereas in other embodiments, the BS(s) 602 may communicate over unlicensed spectrums. The present application is not intended to be limited to the implementation of any particular wireless communication system architecture or protocol. In yet some embodiments of present application, the BS(s) 602 may communicate with the UE(s) 601 using the 3GPP 5G protocols.

Each BS(s) 602 may include one or more cells. Each UE(s) 601 may perform a cell section procedure between different cell(s) of different BS(s). Each UE(s) 601 may handover from a serving cell of a source BS to a target cell of a target BS. For example, in the wireless communication system 600 as illustrated and shown in FIG. 6, BS 602*a* may function as a source BS, and BS 602*b* may function as a target BS. If there is a handover need, UE 601*a* as illustrated and shown in FIG. 6 may perform a handover procedure from a serving cell of BS 602*a* to a target cell of BS 602*b*, which depends a result of a cell selection procedure. The handover procedure performed by UE 601*a* may be a CHO procedure.

Currently, in 3GPP 5G NR system or the like, an radio access operating with shared spectrum channel access can operate in different modes, for example, a mode in which either a PCell, a PSCell, or a SCells can be in shared spectrum, or a mode in which a SCell may or may not be configured with uplink. A BS may operate in either a dynamic access mode or a semi-static channel access mode as described in 3GPP standard document TS37.213. In these both channel access modes, the BS and a UE may apply Listen-Before-Talk (LBT) before performing a transmission on a cell configured with shared spectrum channel access. When LBT is applied, the transmitter listens to or senses the channel to determine whether the channel is free or busy and performs transmission only if the channel is sensed free.

When the UE detects consistent uplink LBT failures, the UE takes actions as specified in 3GPP standard document TS38.321. The detection is per Bandwidth Part (BWP) and based on all uplink transmissions within this BWP. When consistent uplink LBT failures are detected on a SCell(s), the UE reports this to the corresponding BS (a MN for MCG, or a SN for SCG) via MAC CE on a different serving cell than the SCell(s) where the failures were detected. If no resource is available to transmit the MAC CE, a Scheduling Request (SR) can be transmitted by the UE. When consistent uplink LBT failures are detected on a SpCell, the UE switches to another UL BWP with configured RACH resources on that cell, initiates RACH, and reports the failure via MAC CE. When multiple UL BWPs are available for switching, it is up to the UE implementation which one to select. For a PSCell, if consistent uplink LBT failures are detected on all the UL BWPs with configured RACH resources, the UE declares SCG RLF and reports the failure to the MN via SCGFailureInformation. For a PCell, if the uplink LBT failures are detected on all the UL BWP(s) with configured RACH resources, the UE declares a RLF.

Embodiments of the present application may solve issues of: (1) what additional information should be added in a RLF-report in a case in which a RLF happens in source during a UE is performing a DAPS handover procedure; and (2) what information should be sent to a source cell after a target cell receives a RLF-report from a UE. Specific examples are described and shown in FIGS. 7-10.

Figure 7:
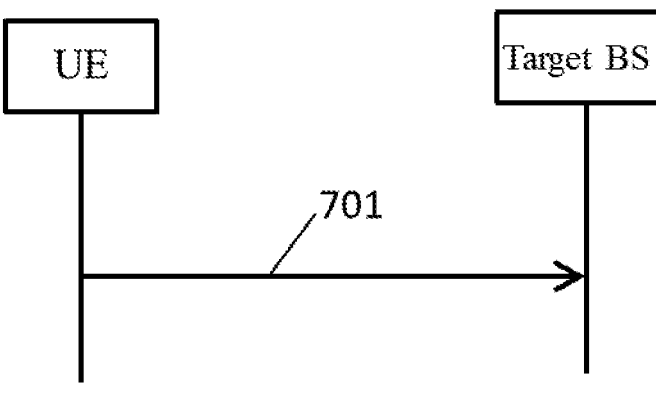
FIG. 7 illustrates an exemplary signal transmission procedure in accordance with some embodiments of the present application.

FIG. 7 illustrates an exemplary signal transmission procedure in accordance with some embodiments of the present application.

Specifically, as shown in FIG. 7, in operation 701, a UE (e.g., UE 101 as illustrated and shown in FIG. 1 or UE 601*a* as illustrated and shown in FIG. 6) transmits a message associated with a failure for a MCG to Target BS (e.g., BS 602*b* as illustrated and shown in FIG. 6). The target BS controls a target cell of the UE. For example, the message associated with the failure for the MCG in operation 701 may be a RLF-report message as specified in 3GPP standard documents.

In particular, a RLF-report message as specified in 3GPP standard document TS38.331 may include the following fields: connectionFailureType, c-RNTI; failedCellId, failedPCellId, failedPCellId-EUTRA, previousPCellId; reestablishmentCellId, rlf-Cause, ssbRLMConfigBitmap, timeConnFailure, and timeSinceFailure.

Figure 8:
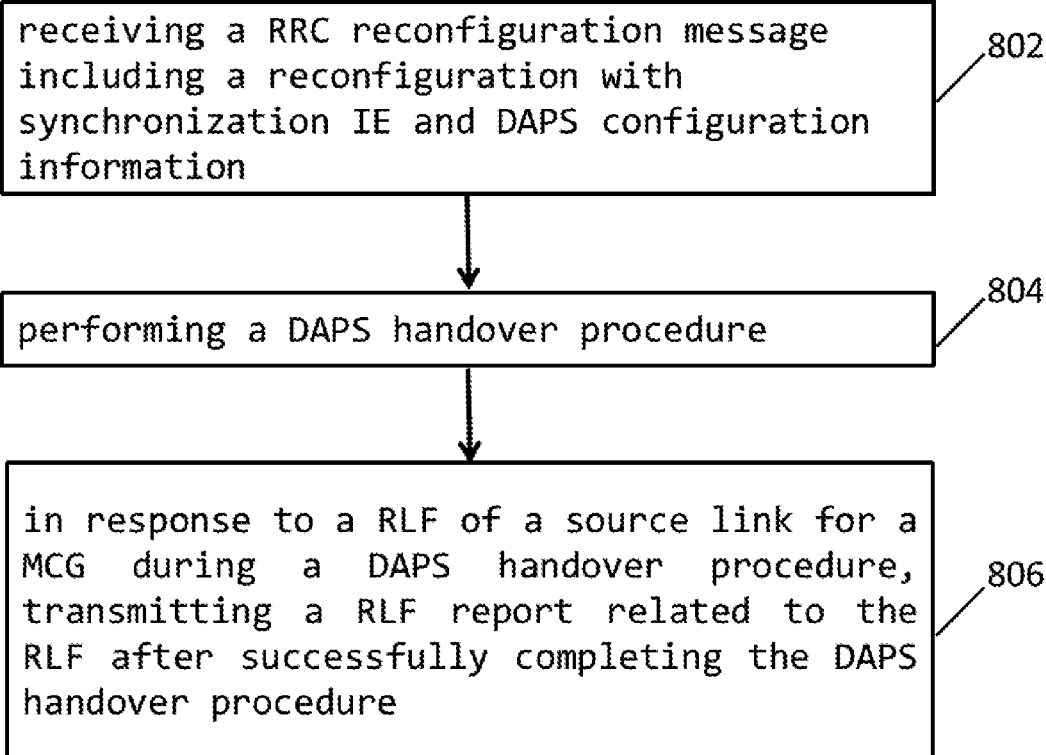
FIG. 8 illustrates a flow chart of a method for a failure report procedure in accordance with some embodiments of the present application.

FIG. 8 illustrates a flow chart of a method for a failure report procedure in accordance with some embodiments of the present application. The method 800 shown in FIG. 8 may be performed by a UE (e.g., UE 601a as shown and illustrated in FIG. 6).

As shown in FIG. 8, in operation 802, a UE may receive a RRC reconfiguration message including a reconfiguration with synchronization IE and DAPS configuration information. In operation 804, the UE may perform a DAPS handover procedure. If a RLF of a source link for a MCG during the DAPS handover procedure, after successfully completing the DAPS handover procedure, the UE may transmit a RLF report related to the RLF, as shown in operation 806.

For example, the UE transmits a RLF-report message to a target BS (e.g., BS 602b as shown and illustrated in FIG. 6). In some embodiments of the present application, the RLF-report message may include at least one of the following new information:

a) New indication regarding a successful completion of the DAPS handover procedure. For example, the indication can be set as "successful DAPS handover". This new indication indicates that a DAPS handover procedure is successfully completed, rather than 'failure'. Otherwise, the network considers that a handover failure happens during the DAPS handover procedure.

b) Previous cell identifier (ID), i.e., a cell ID of a source cell.

c) Connection Failure Type. The connection failure type is configured as a RLF in source.

d) A cause for the RLF of the source link. This cause can be set to one of:

(1) an expiry of a physical layer problem timer;

(2) a problem of a random access procedure;

(3) reaching a maximum number of retransmissions;

(4) a failure of a beam failure recovery procedure;

(5) an expiry of a timer for initiating failure recovery based on triggering a measurement report;

(6) a reception of backhaul (BH) RLF indication; and (7) a failure of a LBT for the source link.

For example, the RLF-report message may include a cause for the RLF of the source link, which is one of t310-Expiry, randomAccessProblem, rlc-MaxNumRetx, beamFailureRecoveryFailure, t312-Expiry, the reception of BH RLF indication, and mcg-lbtFailure, as specified in 3GPP standard documents.

FIG. 9 illustrates a further exemplary signal transmission procedure in accordance with some embodiments of the present application.

As shown in FIG. 9, in operation 901, a target BS (e.g., BS 602b as illustrated and shown in FIG. 6) transmits a message associated with a failure for a MCG to a source BS (e.g., BS 602a as illustrated and shown in FIG. 6). The source BS controls an original serving cell of a UE (e.g., UE 101a as illustrated and shown in FIG. 1). The target BS controls a target cell of the UE.

For example, the target BS transmits a failure indication message to the source BS. This failure indication message is sent by the target BS to indicate an RRC re-establishment attempt or a reception of an RLF report from a UE that suffered a connection failure at the source BS. The purpose of transmitting a failure indication message is to transfer information regarding RRC re-establishment attempts, or received RLF Reports, between NG-RAN nodes. The signaling takes place from a target BS at which a re-establishment attempt is made, or an RLF Report is received, to a source BS to which a UE concerned may have previously been attached prior to the connection failure. This may aid the detection of a RLF.

The failure indication message in operation 901 may be a FAILURE INDICATION message as specified in 3GPP standard documents. The FAILURE INDICATION message may be transmitted by Xn interface or X2 interface.

In particular, a FAILURE INDICATION message as specified in 3GPP standard document TS 38.423 [16] may include the following IEs or Group Names: Message Type, CHOICE Initiating condition, RRC Reestab, Failure Cell PCI, Reestablishment Cell CGI, C-RNTI; shortMAC-I (optionally), UE RLF Report Container (optionally), RRC Setup, and UE RLF Report Container.

The failure indication message transmitted from the target BS to the source BS is associated with the RLF report which is transmitted from the UE in operation 701 as illustrated and shown in FIG. 7. For example, the failure indication message includes a container of the RLF report. The container of the RLF report may be transmitted by Xn interface or X2 interface.

FIG. 10 illustrates a further flow chart of a method for a failure indication procedure in accordance with some embodiments of the present application. The method 1000 shown in FIG. 10 may be performed by a target BS (e.g., BS 602b as illustrated and shown in FIG. 6 and the target BS as illustrated and shown in FIG. 9).

As shown in FIG. 10, in operation 1002, a target BS transmits a UE information request. In operation 1004, the target BS receives a UE information response including a RLF report. The RLF report includes information related to a RLF of a source link for a MCG during a DAPS handover procedure. In an embodiment of the present application, the RLF report may include at least one of: an indication regarding a successful completion of the DAPS handover procedure; a cell identifier (ID) of a source cell; a connection failure type; and a cause for the RLF of the source link. The connection failure type may be configured as a RLF in source.

In operation 1006, the target BS transmits a failure indication. The failure indication may include an IE regarding a successful completion of the DAPS handover procedure. For example, the failure indication includes an indication which is set as "successful DAPS handover".

In some embodiments of the present application, the failure indication transmitted in operation 1004 may include at least one of the following IEs: a cell ID of a source cell, a cell ID of a target cell, a cause for the RLF of the source link, a container including RLF-report IE reported from UE, and a cell radio network temporary identifier (C-RNTI) in source.

In some embodiments of the present application, the cause for the RLF of the source link in the failure indication includes at least one of:

a) an expiry of a physical layer problem timer;

b) a problem of a random access procedure;

c) reaching a maximum number of retransmissions on radio link control (RLC);

d) a failure of a beam failure recovery procedure;

e) an expiry of a timer for initiating failure recovery based on triggering a measurement report;

f) a reception of BH RLF indication; and g) a failure of a listen-before-talk (LBT) for the source link.

In some embodiments of the present application, the cell ID of the target cell in the failure indication is a physical cell identifier (PCI) or an evolved universal terrestrial radio access network (E-UTRAN) cell global identifier (ECGI).

The following texts describe specific Embodiment 3 of the method as shown and illustrated in FIGS. 7-10 for solving the above issues.

According to Embodiment 3, a UE (e.g., UE 601a as shown and illustrated in FIG. 6) and a target BS (e.g., BS 602b as illustrated and shown in FIG. 6) perform the following operations:

(1) When the UE is performing the DAPS handover procedure, a RLF may happen in source. After a DAPS handover procedure is successfully completed, the UE accesses to a target cell.

(2) UE transmits an indication of rlf-InfoAvailable to a target BS.

(3) After receiving the indication from the UE, the target BS transmits UE information request to the UE.

(4) After receiving the UE information request from the target BS, the UE transmits UE information response including a RLF-report to the target BS. The RLF-report may include:

New indication, e.g., successful DAPS handover procedure.

Previous cell ID, which can be set as a source cell.

Connection Failure Type, which can be set as RLF in source.

RLF Cause for source, which can be set to one of t310-Expiry, randomAccessProblem, rlc-MaxNum-Retx, beamFailureRecoveryFailure, t312-Expiry, the reception of BH RLF indication, and mcg-lbtFailure.

(5) After receiving the UE information response including the RLF-report from the UE, the target BS will transmit a failure indication to a source BS.

The failure indication may include a new IE which is set as "successful DAPS handover". The sub-IE of the new IE "successful DAPS handover" can be one of the follows:

Source cell ID;

Target cell ID, e.g., PCI or ECGI;

Optional RLF cause;

C-RNTI in source; and

UE RLF-report container.

Details described in all other embodiments of the present application (for example, details of how to solve a coexistence issue of a DAPS handover procedure and a RLF report mechanism for a MCG) are applicable for the embodiments of FIGS. 7-10. Moreover, details described in the embodiments of FIGS. 7-10 are applicable for all the embodiments of FIGS. 1-6 and 11.

Figure 11:
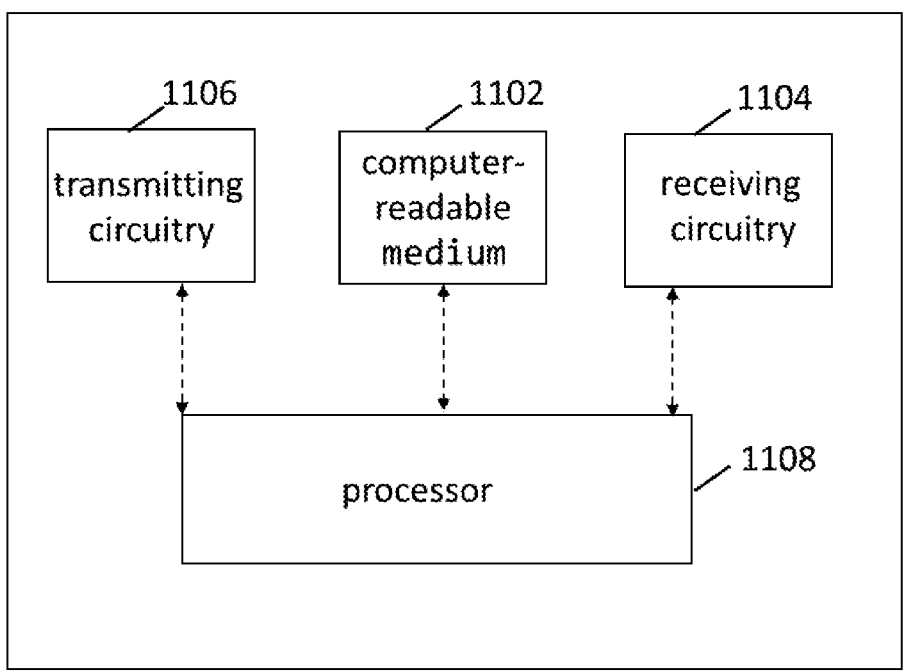
FIG. 11 illustrates a simplified block diagram of an apparatus 1100 for an enhanced failure report mechanism in accordance with some embodiments of the present application.

FIG. 11 illustrates a simplified block diagram of an apparatus 1100 for an enhanced failure report mechanism in accordance with some embodiments of the present application.

In some embodiments, the apparatus 1100 may be UE 101 as shown in FIG. 1 or UE 601a as shown and illustrated in FIG. 6.

In some other embodiments, the apparatus 1100 may be a target BS, e.g., BS 602b as illustrated and shown in FIG. 6.

Referring to FIG. 11, the apparatus 1100 may include at least one non-transitory computer-readable medium 1102, at least one receiving circuitry 1104, at least one transmitting circuitry 1106, and at least one processor 1108. In some embodiment of the present application, at least one receiving circuitry 1104 and at least one transmitting circuitry 1106 and be integrated into at least one transceiver. The at least one non-transitory computer-readable medium 1102 may have computer executable instructions stored therein. The at least one processor 1108 may be coupled to the at least one non-transitory computer-readable medium 1102, the at least one receiving circuitry 1104 and the at least one transmitting circuitry 1106. The computer executable instructions can be programmed to implement a method with the at least one receiving circuitry 1104, the at least one transmitting circuitry 1106 and the at least one processor 1108. The method can be a method according to an embodiment of the present application, for example, the corresponding method shown in FIG. 5A, FIG. 5B, FIG. 8, or FIG. 10.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communication, comprising:
  at least one memory; and
  at least one processor coupled with the at least one memory and configured to cause the UE to:
    receive configuration information including a first timer associated with fast master cell group (MCG) link recovery;
    receive a first radio resource control (RRC) reconfiguration message including dual active protocol stack (DAPS) configuration information;
    perform a DAPS handover procedure;
    start a second timer for handover, the second timer for handover based on the DAPS configuration information;
    initiate, in response to a radio link failure (RLF) of a source link for a MCG during the DAPS handover procedure, a MCG failure information procedure when the second timer for handover is running; and
    start the first timer associated with fast MCG link recovery.

2. The UE of claim 1, wherein the at least one processor is configured to cause the UE to:
  transmit a MCG failure information message in response to initiating the MCG failure information procedure;
  receive a second RRC reconfiguration message, wherein the second RRC reconfiguration message includes a reconfiguration with synchronization information element (IE); and
  execute, in response to receiving the second RRC reconfiguration message, a reconfiguration with synchronization procedure and stop performing the DAPS handover procedure.

3. The UE of claim 1, wherein the at least one processor is configured to cause the UE to:
  transmit a MCG failure information message in response to initiating the MCG failure information procedure;
  receive a second RRC reconfiguration message, wherein the second RRC reconfiguration message includes a reconfiguration with synchronization information element (IE); and
  ignore, in response to receiving the second RRC reconfiguration message, the second RRC reconfiguration message and continue performing the DAPS handover procedure.

4. The UE of claim 1, wherein the at least one processor is configured to cause the UE to:
  receive a RRC release message; and
  release, in response to receiving the RRC release message, a resource associated with the source link and continue performing the DAPS handover procedure.

5. The UE of claim 1, wherein the at least one processor is configured to cause the UE to:
  receive a RRC release message; and
  ignore, in response to receiving the RRC release message, the RRC release message and continue performing the DAPS handover procedure.

6. The UE of claim 1, wherein the at least one processor is configured to cause the UE to:

transmit a MCG failure information message in response to initiating the MCG failure information procedure; and
  not initiate, in response to that the first timer associated with fast MCG link recovery expires, a RRC connection re-establishment procedure when performing the DAPS handover procedure.

7. A user equipment (UE) for wireless communication, comprising:
  at least one memory; and
  at least one processor coupled with the at least one processor and configured to cause the UE to:
    receive a radio resource control (RRC) reconfiguration message including a reconfiguration with synchronization information element (IE) and dual active protocol stack (DAPS) configuration information;
    perform a DAPS handover procedure based on the synchronization IE and the DAPS configuration information; and
    transmit, in response to a radio link failure (RLF) of a source link for a master cell group (MCG) during the DAPS handover procedure, a report related to the RLF after successfully completing the DAPS handover procedure, wherein the report includes an indication indicating a successful completion of the DAPS handover procedure, a cell identifier (ID) of a source cell, a connection failure type, and a cause for the RLF of the source link.

8. The UE of claim 7, wherein the connection failure type is configured as an RLF in source.

9. The UE of claim 7, wherein the cause for the RLF of the source link includes at least one of:
  an expiry of a first timer for a physical layer problem;
  a problem of a random access procedure;
  reaching a maximum number of retransmissions;
  a failure of a beam failure recovery procedure;
  an expiry of a second timer for initiating failure recovery based on triggering a measurement report;
  a reception of backhaul (BH) RLF indication; or
  a failure of a listen-before-talk (LBT) for the source link.

10. The UE of claim 7, wherein the at least one processor is configured to cause the UE to:
  receive configuration information including a first timer associated with fast MCG link recovery; and
  initiate, in response to the RLF of the source link for the MCG during the DAPS handover procedure, a MCG failure information procedure when the first timer associated with fast MCG link recovery is not running and a second timer for handover is not running.

11. The UE of claim 10, wherein the second timer for handover is associated with DAPS configuration information.

12. A base station for wireless communication, comprising:
  at least one memory; and
  at least one processor coupled with the at least one processor and configured to cause the base station to:
    transmit a user equipment (UE) information request;
    receive a UE information response including a report, wherein the report includes information related to a radio link failure (RLF) of a source link for a master cell group (MCG) during a dual active protocol stack (DAPS) handover procedure, wherein the report includes an indication indicating a successful completion of the DAPS handover procedure, a cell identifier (ID) of a source cell, a connection failure type, and a cause for the RLF of the source link; and transmit a failure indication, wherein the failure indication includes an information element (IE) indicating the successful completion of the DAPS handover procedure.

13. The base station of claim 12, wherein the failure indication includes at least one of:

the cell ID of the source cell;

a cell ID of a target cell;

the cause for the RLF of the source link;

a container including RLF-report IE reported from a UE; or a cell radio network temporary identifier (C-RNTI) in source.

14. The base station of claim 13, wherein the cause for the RLF of the source link includes at least one of:

an expiry of a physical layer problem timer;

a problem of a random access procedure;

reaching a maximum number of retransmissions on radio link control (RLC);

a failure of a beam failure recovery procedure;

an expiry of a timer for initiating failure recovery based on triggering a measurement report;

a reception of backhaul (BH) RLF indication; or a failure of a listen-before-talk (LBT) for the source link.

15. The base station of claim 13, wherein the cell ID of the target cell comprises at least one of:

a physical cell identifier (PCI); or an evolved universal terrestrial radio access network (E-UTRAN) cell global identifier (ECGI).

16. The base station of claim 12, wherein the cause for the RLF of the source link includes at least one of:

an expiry of a physical layer problem timer;

a problem of a random access procedure;

reaching a maximum number of retransmissions on radio link control (RLC);

a failure of a beam failure recovery procedure;

an expiry of a timer for initiating failure recovery based on triggering a measurement report;

a reception of backhaul (BH) RLF indication; or a failure of a listen-before-talk (LBT) for the source link.

17. The base station of claim 12, wherein the base station is a target base station for the DAPS handover procedure.

18. The base station of claim 17, wherein the at least one processor is configured to cause the base station to transmit the UE information request to a source base station to which a UE is connected.

19. A method performed by a user equipment (UE), the method comprising:

receiving a radio resource control (RRC) reconfiguration message including a reconfiguration with synchronization information element (IE) and dual active protocol stack (DAPS) configuration information;

performing a DAPS handover procedure based on the synchronization IE and the DAPS configuration information; and transmitting, in response to a radio link failure (RLF) of a source link for a master cell group (MCG) during the DAPS handover procedure, a report related to the RLF after successfully completing the DAPS handover procedure, wherein the report includes an indication indicating a successful completion of the DAPS handover procedure, a cell identifier (ID) of a source cell, a connection failure type, and a cause for the RLF of the source link.

20. The method of claim 19, wherein the connection failure type is configured as an RLF in source.

*    *    *    *    *